United States Patent
Schmidt et al.

(10) Patent No.: US 12,043,336 B2
(45) Date of Patent: Jul. 23, 2024

(54) BICYCLE FRAME TUBE

(71) Applicant: Canyon Bicycles GmbH, Koblenz (DE)

(72) Inventors: Patrick Schmidt, Koblenz (DE); Philipp Klein, Koblenz (DE); Christian Parmenter, Koblenz (DE); Vincenz Thoma, Obermaiselstein (DE)

(73) Assignee: Canyon Bicycles GmbH, Koblenz (DE)

( * ) Notice: Subject to any disclaimer, the term of this patent is extended or adjusted under 35 U.S.C. 154(b) by 122 days.

(21) Appl. No.: 17/487,004

(22) Filed: Sep. 28, 2021

(65) Prior Publication Data

US 2022/0106004 A1 Apr. 7, 2022

(30) Foreign Application Priority Data

Oct. 1, 2020 (DE) .................... 20 2020 105 635.2

(51) Int. Cl.
*B62J 43/28* (2020.01)
*B62J 43/23* (2020.01)
*B62M 6/90* (2010.01)

(52) U.S. Cl.
CPC .............. *B62J 43/28* (2020.02); *B62J 43/23* (2020.02); *B62M 6/90* (2013.01)

(58) Field of Classification Search
CPC ... B62M 6/90; B62J 43/28; B62J 43/23; B62J 43/19; B62J 43/16; B62J 43/13; B62J 43/10
USPC ..................................................... 180/207.3
See application file for complete search history.

(56) References Cited

U.S. PATENT DOCUMENTS

| | | | |
|---|---|---|---|
| 8,413,947 B2 * | 4/2013 | Chiang | H01M 50/244 206/703 |
| 8,469,381 B2 | 6/2013 | Dodman et al. | |
| 2011/0285328 A1 * | 11/2011 | Rittenhouse | B60L 7/14 310/43 |
| 2017/0190243 A1 | 7/2017 | Duan et al. | |
| 2018/0148128 A1 | 5/2018 | Talavasek et al. | |
| 2020/0062325 A1 | 2/2020 | Talavasek et al. | |
| 2020/0062342 A1 | 2/2020 | Talavasek et al. | |
| 2020/0079471 A1 | 3/2020 | Eguchi | |
| 2020/0247502 A1 * | 8/2020 | Mitsuyasu | H01M 50/202 |
| 2020/0354017 A1 * | 11/2020 | De La Serna Gonzalez | B62M 6/90 |
| 2020/0398931 A1 * | 12/2020 | Talavasek | B60L 50/64 |
| 2021/0147032 A1 * | 5/2021 | Farrell | B62K 3/04 |
| 2022/0106007 A1 * | 4/2022 | Thoma | B62K 19/06 |
| 2022/0289336 A1 * | 9/2022 | Philipzik | B62J 43/13 |

FOREIGN PATENT DOCUMENTS

| | | |
|---|---|---|
| DE | 69508196 T2 | 6/1999 |
| DE | 69826084 T2 | 1/2005 |
| DE | 202015103750 U1 | 11/2016 |
| DE | 102016010338 A1 | 3/2018 |

(Continued)

*Primary Examiner* — Anne Marie M Boehler
(74) *Attorney, Agent, or Firm* — The Webb Law Firm

(57) ABSTRACT

A bicycle frame tube which is in particular a down tube of a bicycle frame comprises a battery opening for inserting or removing a battery. Inside the bicycle frame tube a holding element for holding the battery is arranged. The holding element is at least partially elastically deformable, wherein the holding element in particular comprises two abutment elements which are elastically deformable.

5 Claims, 4 Drawing Sheets

(56) References Cited

FOREIGN PATENT DOCUMENTS

| | | |
|---|---|---|
| DE | 102018200891 A1 | 7/2018 |
| DE | 102019104238 A1 | 8/2019 |
| DE | 212018000304 U1 | 9/2020 |
| EP | 2423096 A2 | 2/2012 |

* cited by examiner

BICYCLE FRAME TUBE

CROSS-REFERENCE TO RELATED APPLICATION

This application claims priority to German Patent Application No. 20 2020 105 635.2 filed Oct. 1, 2020, the disclosure of which is hereby incorporated by reference in its entirety.

BACKGROUND OF THE DISCLOSURE

The disclosure relates to a bicycle frame tube, in particular a down tube of a bicycle frame.

DESCRIPTION OF RELATED ART

In the case of e-bikes it is known to arrange a battery inside the down tube as described in DE 10 2016 010 338 and US2020/0062325, for example. For this purpose, the down tube comprises, at its bottom-bracket-side end, a battery opening which is open in the longitudinal direction of the down tube. Through said opening the battery can be inserted into the down tube from below in the longitudinal direction. According to the embodiment described in US2020/0062325, the battery is fixed in the down tube by a cap arranged at the battery housing at the upper end of the battery. In the inserted condition, the upper end of the battery is arranged in the area of the downtube facing in the direction of the head tube. The cap abuts on the inside of the down tube. Thus, it is required that in the abutment area the inside of the down tube is manufactured with a narrow tolerance for allowing simple insertion of the battery on the one hand and ensuring clearance-free holding of the upper end of the battery on the other hand. At the bottom-bracket-side end the battery is fixed to the down tube by screws.

SUMMARY OF THE DISCLOSURE

It is an object of the disclosure to provide a bicycle frame tube, in particular a down tube of a bicycle frame, where a battery can be arranged in a reliable and inexpensive manner.

According to the disclosure, the object is achieved with a bicycle frame tube, in particular a down tube of a bicycle frame, having the features of disclosed herein.

The bicycle frame tube according to the disclosure, which is in particular a down tube of a bicycle frame, comprises a battery opening for inserting or removing a battery. Here, the battery can comprise a battery housing, a plurality of cells, a controller and the like. Inside the bicycle frame tube according to the disclosure a holding element for holding the battery is arranged. The holding element is at least partially elastically deformable. Provision of a holding element on the inside of a wall of the bicycle frame tube obviates the need for manufacturing the bicycle frame tube with a narrow tolerance or processing the inside of the bicycle frame tube. Rather, the battery is held via the at least partially deformable holding element.

According to a preferred embodiment, the holding element has such an elasticity that, when the battery housing is inserted vertically to the battery axis, it is compressed by 0.5 to 2.0 mm, in particular 0.8 to 1.5 mm in the installed condition. Here, compression is realized in particular by a user manually inserting the battery into a down tube from below.

Due to the elastic configuration of at least a portion of the holding element, a biasing or holding force is exerted on the battery.

Where appropriate, two opposite holding elements can be provided inside the bicycle frame. Also, the holding element can be configured such that it encompasses the battery in its inserted condition like a clamp or is U-shaped. The battery or the battery housing can be configured such that it comprises a bulge or an abutment surface on its outside. These can be a convexly bent bulge or convexly bent projections, for example. In the inserted condition, it is preferably arranged opposite the holding element.

Preferably, the holding element comprises an abutment element. When the battery is inserted, said holding element abuts on an outside of the battery. The abutment element of the holding element allows for the battery to be in particular vertically held. Here, the abutment element is configured such that it acts as a sliding bearing or as a floating bearing. It is particularly preferred that the abutment element is elastically deformable in particular essentially vertically to an inner wall of the bicycle frame tube and/or vertically to an outside of the battery. Thereby, a holding or biasing force is exerted on the battery such that the battery is reliably held. Here, it is additionally particularly preferred that the abutment element is convex, i.e. bent towards the inside of the bicycle frame tube, relative to an inner wall of the bicycle frame tube.

According to a particularly preferred embodiment, the holding element according to the disclosure is configured such that a hollow space or intermediate space is defined between the abutment element and an inner wall of the bicycle frame tube such that an elastic deformation can be realized in a simple manner. Preferably, the holding element comprises two supporting elements each connected to the abutment element. Said supporting elements serve for supporting the abutment element on the inside of the bicycle frame tube. The supporting elements are either connected to the bicycle frame tube or abut on the latter. Here, it is preferred that the abutment element is in particular arranged between the two supporting elements in the longitudinal direction. Here, the longitudinal direction is the longitudinal direction of the bicycle frame tube or the insertion direction of the battery. It is further preferred that the holding element is fixed to the bicycle frame tube by means of one of the two supporting elements. According to a preferred embodiment, it suffices to realize the fastening via only one of the two supporting elements.

Preferably, a battery securement is additionally provided for preventing the holding element from turning inside the bicycle frame tube. This can be realized by providing a pin extending into an opening, by a noncircular configuration of a boss engaging into a complementary recess or the like.

According to a preferred aspect of the disclosure, a guiding element is arranged opposite the holding element. The guiding element can be arranged at an inner wall of the bicycle frame tube such that the battery, in its inserted condition, is arranged between the holding element and the guiding element. Also, the guiding element can be arranged at a corresponding outer wall of the battery. This offers the advantage that only one element, namely the holding element, must be fixed inside the bicycle frame tube. Thus, the bicycle frame tube is not weakened by a second fastener.

According to a particularly preferred embodiment of the disclosure, the holding element comprises a fixing element. The fixing element serves for laterally holding the battery. For this purpose, the fixing element cooperates with the battery or the battery housing in the inserted condition. For example, the holding element as a fixing element can comprise a boss, such as the pin-shaped boss engaging into a groove of the battery extending in the longitudinal direction. Preferably, the fixing element comprises a recess, such as a groove, extending in the longitudinal direction of the bicycle frame tube or in the insertion direction. In the inserted condition, a boss connected to the battery engages into the groove.

It is particularly preferred that the recess is funnel-shaped in the longitudinal direction and/or the boss is wedge-shaped in the longitudinal direction. Hence, the insertion of the battery and thus the insertion of the boss into the recess are simplified. It is particularly preferred that the recess is integrated in the abutment element. In particular, the abutment element can comprise two components each of which is in particular convexly bent and which are arranged at such a distance to each other that a groove or a recess is defined between the two components.

Preferably, the holding element is fixed to the bicycle frame tube via a fixing means. The fixing means is preferably arranged in an opening in the bicycle frame tube. Thereby, it is possible to fix the holding element through the opening or in the opening from outside.

According to a particularly preferred embodiment, the opening is a switch opening. According to a preferred embodiment, a mechanical switch is arranged in this opening. The mechanical switch cooperates with the battery inserted in the battery opening and serves for mechanically actuating an on/off switch of the battery. For this purpose, the mechanical switch comprises in particular a switching element which serves for actuating the on/off switch of the battery. In the opening in particular configured as a switch opening in the bicycle frame tube thus the mechanical switch on the one hand and the holding element for the battery on the other hand are fixed. Thus, the opening has a double function and serves for holding the two components. In particular, the two components are configured in one piece.

Preferably, the mechanical switch comprises an operating element, such as a button or the like. According to a particularly preferred embodiment, the operating element is asymmetrically arranged in the switch opening for allowing for easy operation. Further, this offers the advantage that the fixing means can be arranged beside the operating element. In particular, the fixing means can be a screw by means of which the holding element is fixed.

Further, the disclosure relates to a bicycle frame having a motor accommodation portion for an electric motor. The bicycle frame comprises a plurality of frame tubes, in particular a top tube, a down tube, a saddle tube and a head tube. At least one of the frame tubes is configured as described above and in particular comprises the holding element described above for the battery.

BRIEF DESCRIPTION OF THE DRAWINGS

Hereunder the disclosure will be explained in detail on the basis of a preferred embodiment with reference to the accompanying drawings in which.

DETAILED DESCRIPTION

Figure 1:
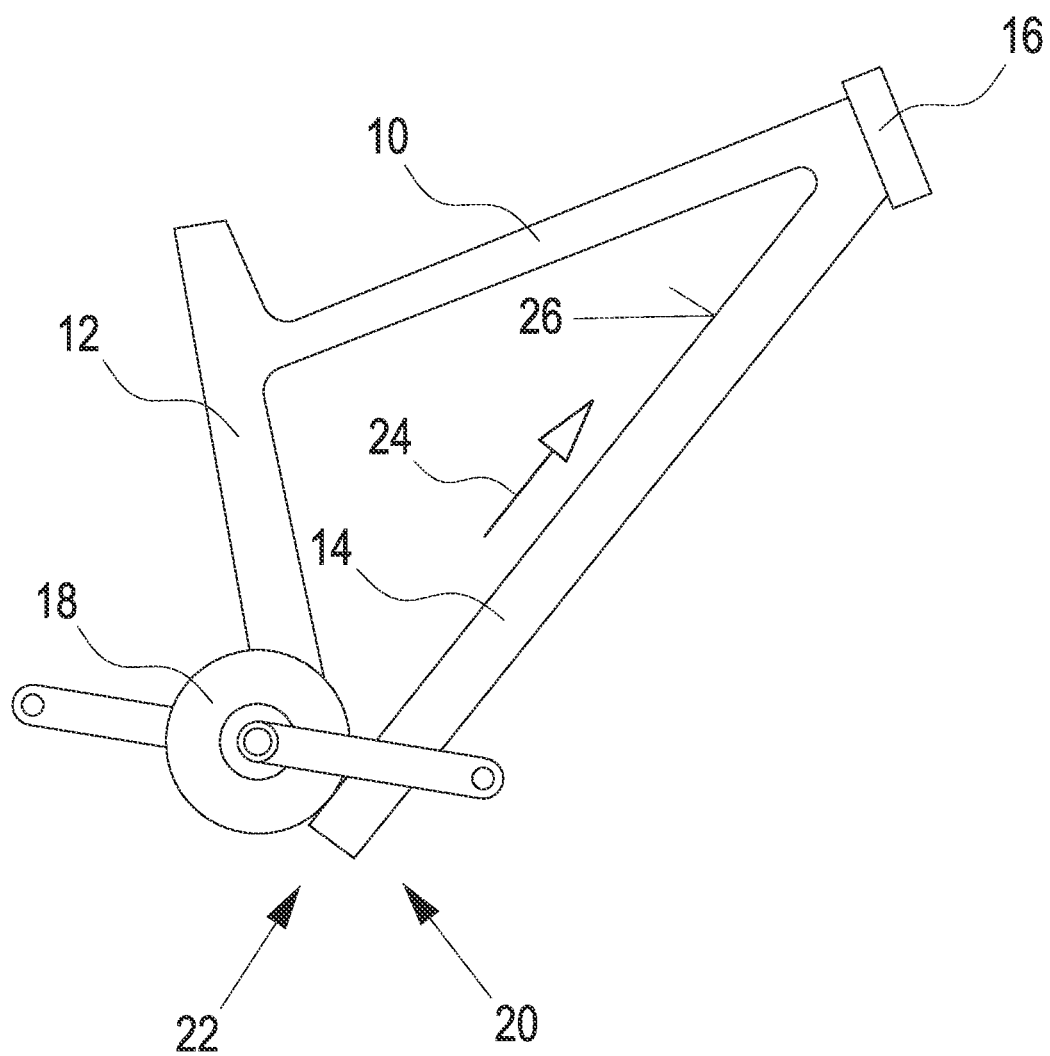
FIG. 1 shows a schematic side view of a bicycle frame.

A bicycle frame usually comprises a top tube 10, a saddle tube 12 connected to the top tube 10, a down tube 14 as well as a head tube 16 connected to the top tube 10 and the down tube 14. Further, a bottom bracket or motor housing 18 is provided serving for accommodating an electric motor of the bottom bracket. Other frame geometries are also known. In the illustrated exemplary embodiment, the down tube 14 is arranged such that a bottom-bracket-side end 20 of the down tube 14 comprises a battery opening 22. The battery opening 22 is thus arranged relative to a longitudinal direction 24 of the down tube 14. In the illustrated exemplary embodiment, a battery can be inserted into the battery opening 22 and into the down tube 14 from below in the longitudinal direction 24.

Figure 2:
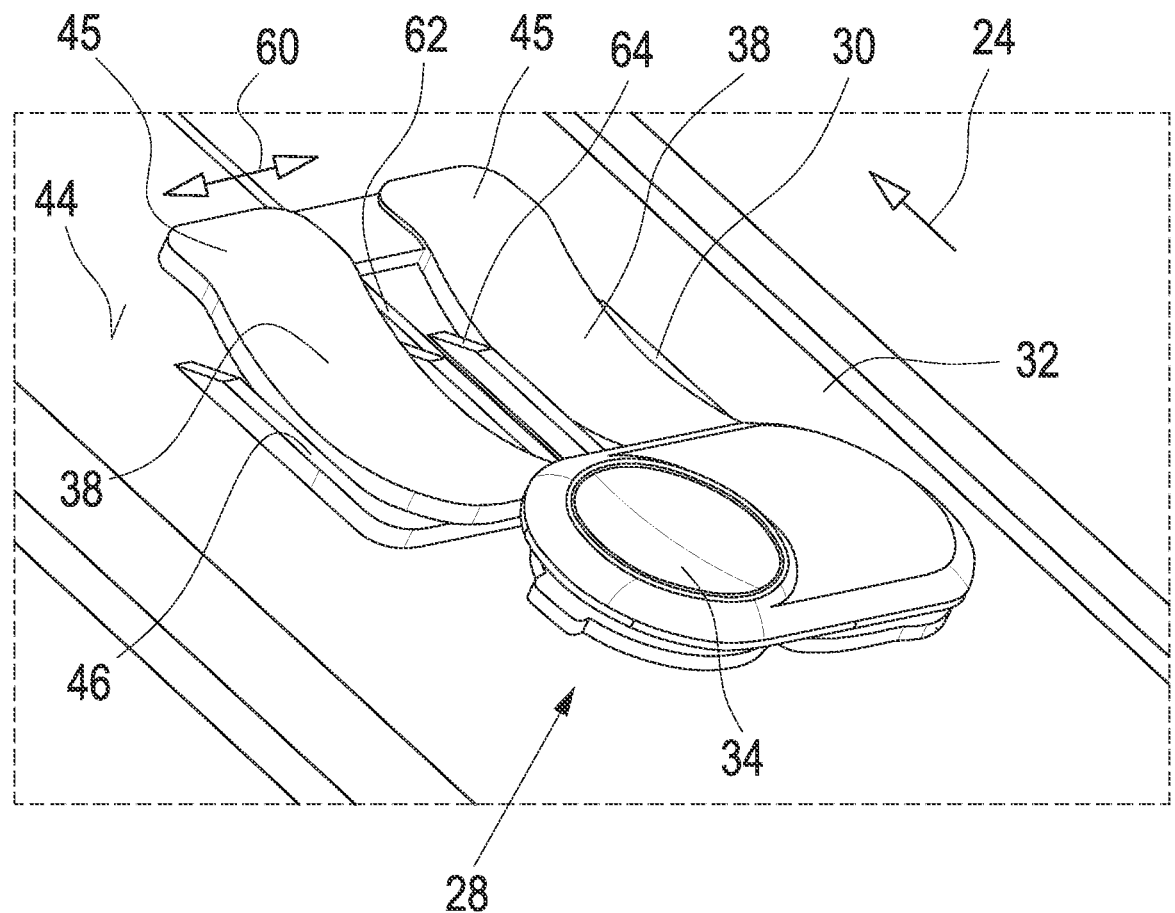
FIG. 2 shows a schematic perspective top view of the holding element together with a battery.

In the illustrated exemplary embodiment, a mechanical switch is arranged at an upper side 26 of the down tube 14 in the area of the down tube 14 facing in the direction of the head tube 16. In the illustrated preferred embodiment, the mechanical switch 28 (FIG. 2) is combined with a holding element 30 for a battery 32 or constitutes an assembly with said holding element. The switch 28 comprises an operating element, such as a button 34, which mechanically cooperates with an on/off switch provided at the battery 32. In FIG. 2, the on/off switch is arranged below the holding element 30. The operating element 34 is held in the, in the illustrated embodiment essentially oval, opening in the frame tube via a fixing means or a switch holding element 30.

Figure 3:
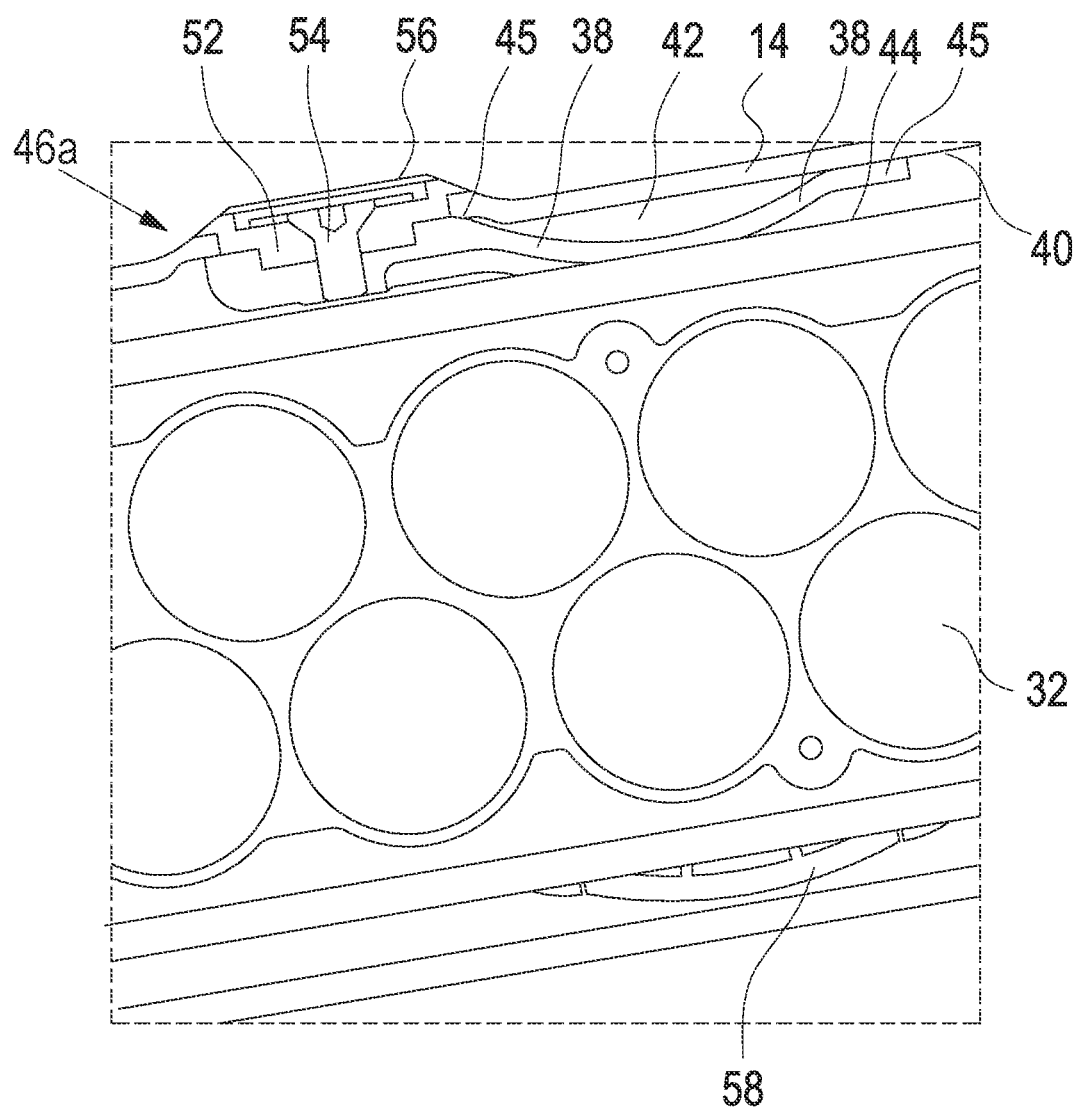
FIG. 3 shows a schematic sectional view of a bicycle frame tube in the longitudinal direction in the area of the holding element.
Figure 4:
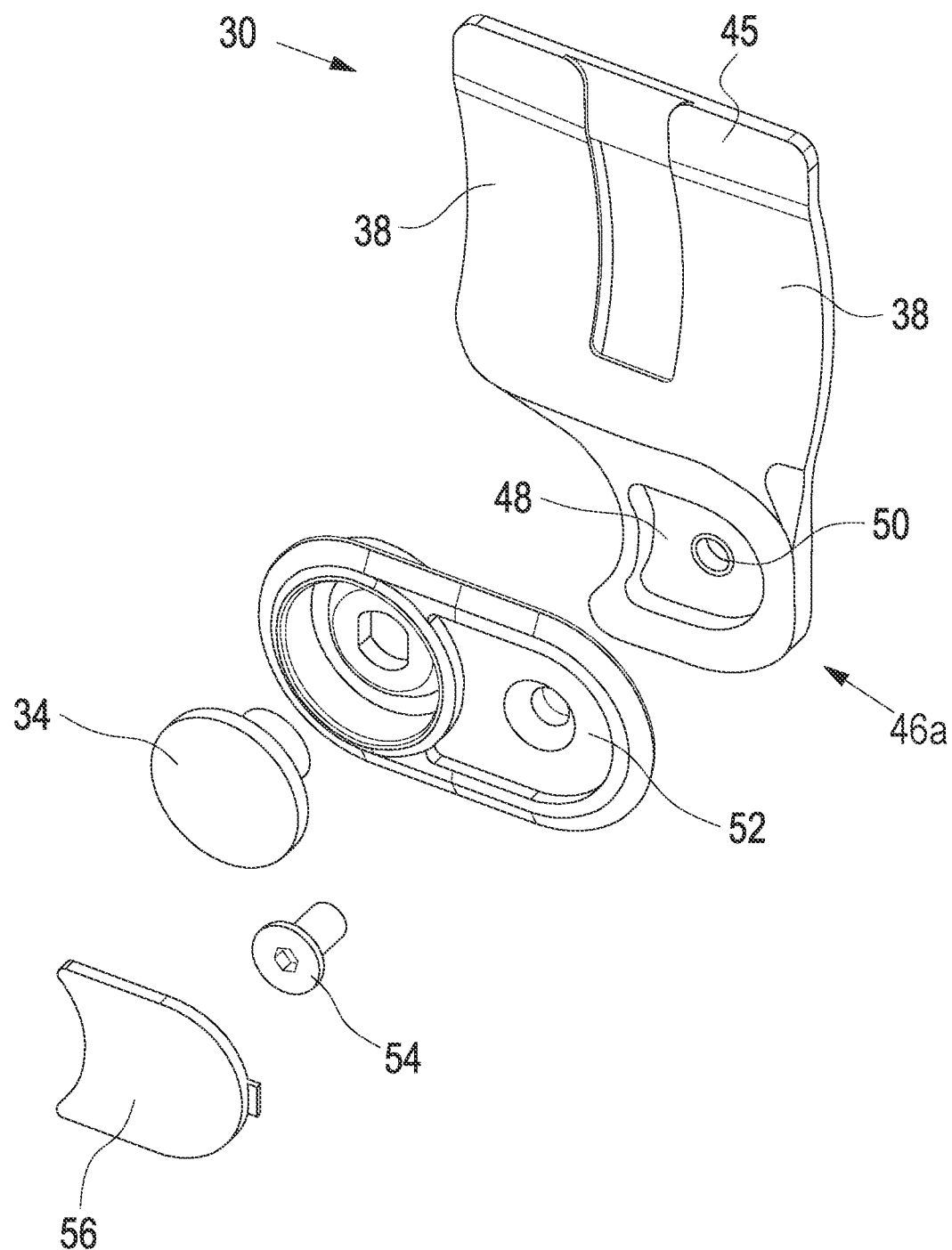
FIG. 4 shows a schematic exploded view of the holding element.

The holding element 30 is arranged inside a frame tube not illustrated in FIG. 2. In the illustrated exemplary embodiment, the holding element 30 comprises an abutment element 38 made up of two arcuate portions. The abutment element 38 is bent inwardly or convexly relative to the down tube 14 (FIG. 3). In particular, the two abutment elements 38 have an elastic configuration. For allowing for an elastic deformation when the battery 32 is inserted and for exerting a compressing force or biasing force on the battery 32 a hollow space 42 is defined between the abutment elements 38 and an inner wall of the bicycle frame tube 14.

The provision of a raised portion 46 facilitates the positioning of the battery in the longitudinal direction. The raised portion 46 biases the holding element 30 in this area.

The at least one abutment element 38 abuts on an outside 44 of the battery 32. For facilitating insertion in the longitudinal direction 24 the outside 44, in the inserted position, comprises the raised portion 46 in the area of abutment of the abutment elements 38.

For supporting on the inside of the downtube 14 the holding element comprises two supporting elements 45 each connected to the abutment element 38. The abutment element 38 is arranged between the two supporting elements 45. One of the two supporting elements 45 may be further connected to a raised portion that acts as a fixing means 46a or is configured as a fixing means. In one instance, when the raised portion is a fixing means 46a, it is configured as a boss connected to the abutment elements 38. The boss comprises a noncircular recess 48. In said recess a threaded bore hole 50 is provided. For installation purposes, the holding element 30 is inserted into the opening in the frame tube 14. A boss 52 of the holding element 30 facing inwardly extends into the opening 48. The noncircular configuration of the opening 48 pre-vents the holding element 30 from turning.

The holding element 30 is fixed with the aid of a screw 54 (FIG. 3). The screw 54 can then be covered with a cover 56.

In the illustrated exemplary embodiment, the battery 32 comprises a guiding element 58. Said guiding element can be a convexly bent boss which is arranged essentially opposite the holding element 30 when the battery 32 is inserted.

For allowing the holding element 30 to protect the battery 32 against lateral movements in the direction indicated by an arrow 60 (FIG. 2) a fixing element is provided. Said fixing element comprises a groove 62 which is formed in the holding element 30 in the illustrated exemplary embodiment. The groove 62 cooperates with a boss 64 which can be a guiding protrusion or the like. The boss 64 is arranged on the outside 44 of the battery 32 and extends in the longitudinal direction 24.

The invention claimed is:

1. A bicycle frame tube, comprising:
a battery opening for inserting or removing a battery, and
a holding element arranged inside the bicycle frame tube for holding the battery,
wherein the holding element is at least partially elastically deformable, wherein the holding element is fixed to the bicycle frame tube via a fixing means arranged in an opening in the bicycle frame tube, and wherein a switch for switching the battery on and off is additionally arranged in the opening.

2. The bicycle frame tube according to claim 1, wherein the switch comprises a switching element which mechanically acts upon an on/off switch provided at the battery when the battery is inserted.

3. The bicycle frame tube according to claim 2, wherein the switch comprises an operating element for actuating the switching element on an outside of the bicycle frame tube.

4. The bicycle frame tube according to claim 3, wherein the operating element is arranged such that it is laterally offset relative to a central plane of the bicycle frame.

5. A bicycle frame comprising a motor accommodation portion for accommodating an electric motor and a plurality of frame tubes, wherein at least one of the frame tubes is configured as the bicycle frame tube according to claim 1.

* * * * *